US010750042B2

United States Patent
Bermundo et al.

(10) Patent No.: US 10,750,042 B2
(45) Date of Patent: Aug. 18, 2020

(54) SCAN PRIVACY TOOL AND METHODS

(71) Applicant: KYOCERA DOCUMENT SOLUTIONS INC., Osaka (JP)

(72) Inventors: Neil-Paul Bermundo, Glendora, CA (US); Philip Ver Dabon, Torrance, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/386,956

(22) Filed: Apr. 17, 2019

(65) Prior Publication Data

US 2019/0245984 A1 Aug. 8, 2019

Related U.S. Application Data

(63) Continuation of application No. 15/476,289, filed on Mar. 31, 2017, now Pat. No. 10,306,090.

(51) Int. Cl.
*H04N 1/00* (2006.01)
(52) U.S. Cl.
CPC ....... *H04N 1/0087* (2013.01); *H04N 1/00018* (2013.01); *H04N 1/00411* (2013.01); *H04N 2201/0094* (2013.01)

(58) Field of Classification Search
CPC ............ H04N 1/4446; H04N 1/00392; H04N 1/0044; H04N 2201/0094; H04N 2201/328
See application file for complete search history.

(56) References Cited

U.S. PATENT DOCUMENTS

| 8,130,951 B2 | 3/2012 | Tian | |
|---|---|---|---|
| 2008/0137129 A1* | 6/2008 | Ferlitsch | H04N 1/00209 358/1.15 |
| 2010/0110464 A1* | 5/2010 | Kardamilas | H04N 1/00355 358/1.13 |

\* cited by examiner

*Primary Examiner* — Quang N Vo
(74) *Attorney, Agent, or Firm* — Millen, White, Zelano & Branigan, P.C.; William Nixon

(57) ABSTRACT

A multi-functional printing (MFP) includes a scan privacy tool to allow edits and changes to a scanned document image to remove or hide private information within a document. The scan privacy tool is enabled for jobs on the MFP device and launches when a job is run. The document is scanned and a scanned document image displayed on a display and edit interface of the scan privacy tool. Changes are made to the image using tools available through the scan privacy tool. The changes are applied to the scanned document image. The modified image is saved and transmitted to an engine in the MFP device to complete the job.

19 Claims, 7 Drawing Sheets

SCAN PRIVACY TOOL AND METHODS

FIELD OF THE INVENTION

The present invention relates to scanning documents and using a scan privacy tool to perform actions on the scanned document at the printer prior to saving the scanned image.

DESCRIPTION OF THE RELATED ART

A user must take several measures when removing or hiding confidential information on a scanned, faxed, or to-be-copied document. In order to avoid disclosure of confidential information, the user uses post-it notes, tape, correction fluid, or stickers to block it from being reproduced or viewed in a subsequent document. Another way to hide the confidential information is to make a soft copy of the document, edit it through a document-editing software program on a computer, and then reprint the corrected, edited, or fixed document. All of these tasks take time and resources, many times away from the printer or scanner. Further, a computer or appropriate office supplies may not be available to use. The resulting document also looks unprofessional in the case of using post-it notes and the like.

SUMMARY OF THE INVENTION

A multi-functional printing (MFP) device is disclosed. The MFP device includes a scanning component to generate an image file of a document. The MFP device also includes a privacy tool. The privacy tool includes an imaging interface for the scanning component to store the image file in a memory location. The privacy tool also includes a display and edit interface to receive the image file from the imaging interface and to display the image file. The display and edit interface performs an action to modify the image file. The privacy tool also includes a privacy tool library to support the action to modify the image file as received by the display and edit interface. The MFP device also includes an engine to receive the modified image file from the display and edit interface in order to process the modified image file.

A scan privacy tool for use with a multi-functional printing device also is disclosed. The scan privacy tool includes an imaging interface to receive an image file of a document and to store the image file. The scan privacy tool also includes a display and edit interface to receive and to display the image file. The scan privacy tool also includes a privacy tool library having at least one tool to support an action to modify the image file. The display and edit interface uses the at least one tool to modify the image file.

A method for modifying an image file of a document also is disclosed. The method includes displaying the image file on a display and edit interface of a scan privacy tool. The method also includes selecting a tool from a scan privacy tool library of the scan privacy tool. The method also includes modifying the image file using the scan privacy tool. The method also includes saving the modified image file. The method also includes transmitting the modified image file to an engine of a multi-functional printing device.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
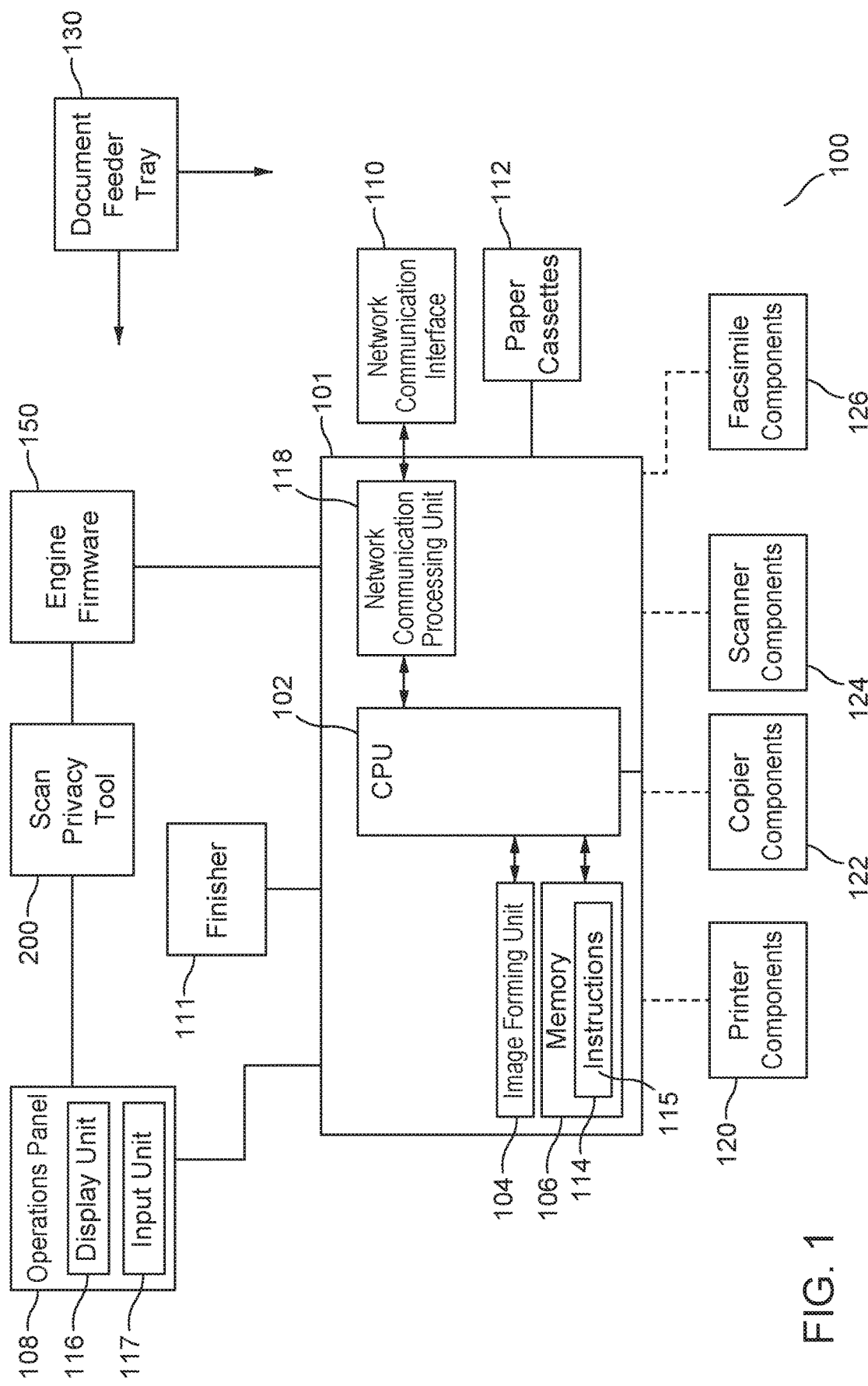
FIG. 1 illustrates a block diagram of a multi-functional printer having a scan privacy tool according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

In some embodiments, a scan privacy tool is a scanner tool used after scanning a page or document but prior to saving the scanned image at a multi-functional printer (MFP). It may be a post-scan tool used to make corrections, markings, highlights, colorization, de-colorization, erasures, masks, blurs, and the like in conjunction with MFP scan, copy, and fax features. The scan privacy tool may act as an annotation tool that is focused specifically to clean out confidential information as opposed to using notes, correction fluid, or computer programs. Thus, one does not need a computer or office supplies for modifying or hiding information as all of these capabilities are located at the scanner or MFP.

The scan privacy tool is a tool that may respond to these tasks. It is not an annotation software solution per se. The scan privacy tool provides the capability to erase or block-out confidential keywords, numbers, phrases, codes, or pictures as well as the ability to do simple yet needed and practical corrections on scanned pages or images. Hereinafter, use of the term "image" includes scanned pages and documents.

The disclosed scan privacy tool includes several features that provide benefits when using a MFP for scanning or reproduction of documents. One feature is an easily accessible proofreading service and tool located at the scanner or MFP engine. The scan privacy tool also improves the use of the MFP with a document reflective mat. The scan privacy tool software development kit and application program interfaces on top of the scanner firmware to expose the scanned image may lead to development of other applications and business models incorporated with the MFP.

The following terminologies may be used as disclosed below:

A Page Description Language (PDL) is a type of programming language that describes the document or pages in a print job. Examples of PDLs include Printer Command Language (PCL) 5, PCLXL or PCL 6, and PostScript. Portable Document Format (PDF) and XML Paper Specification (XPS) also belong to this group. Image formats such as JPG or TIFF, which also may be printed, may be special cases that are handled by the PDL.

A Graphics Rendering Component is an internal component in RIP firmware that translates the PDL commands or date into binary data that the MFP engine understands. This is similar to machine language to which programming languages are translated for computing devices to understand. The binary data is understood by the hardware in the MFP and converted into actual drawings or pixels on the paper.

A Software Development Kit (SDK) is a library for adding and enabling features in a software or firmware package. It also is a library to allow for development of applications on top of the software or firmware package.

An Application Programming Interface (API) is a set of interface functions that may be programmatically accessed at the MFP engine for interacting and cooperating with the firmware at run-time or during the use of the display and edit interface.

A scanned document image refers to the raster or binary image representation of the scanned document that the MFP has translated from the document on the scanner flatbed or document processor tray.

An original source pattern is a part of the scanned document image that the user is interested in modifying, correcting, or editing using the scan privacy tool. The part may be like a rectangular or shaped area or, alternatively, an irregular shaped area in the document.

A modification pattern is a raster image of the modified source pattern that is created after applying the scan privacy tool.

Pattern-Rule Pairs refer to a mapping of the original source pattern and rules that would be applied to the source pattern for editing, updating, modifying, or correcting the original source image, or scanned document image. The source pattern can be a raster or binary image of a plain text that can be searched in the scanned document image. The rules may be a list of modification patterns or at least one library tool that can be applied to the source pattern.

FIG. 1 depicts a block diagram of a multi-functional printer (MFP) 100 having a scan privacy tool 200 according to the disclosed embodiments. The architecture shown in FIG. 1 may apply to any multi-functional printer or image forming apparatus that scans documents to perform other functions, such as printing, storing, copying, and the like.

MFP 100 includes a computing platform 101 that performs operations to support these functions. Computing platform 101 includes a computer processing unit (CPU) 102, an image forming unit 104, a memory unit 106, and a network communication interface 110. Other components may be included but are not shown for brevity. MFP 100, using computing platform 101, may be configured to perform various operations, such as scanning, copying, printing, receiving or sending a facsimile, or document processing. As such, MFP 100 may be a printing device or a multi-function peripheral including a scanner, and one or more functions of a copier, a facsimile device, and a printer.

To provide these functions, MFP 100 includes printer components 120 to perform printing operations, copier components 122 to perform copying operations, scanner components 124 to perform scanning operations, and facsimile components 126 to receive and send facsimile documents. CPU 102 may issue instructions to these components to perform the desired operations.

MFP 100 also includes a finisher 111 and one or more paper cassettes 112. Finisher 111 includes rotatable downstream rollers to move papers with an image formed surface after the desired operation to a tray. Finisher 111 also may perform additional actions, such as sorting the finished papers, binding sheets of papers with staples, doubling, creasing, punching holes, folding, and the like. Paper cassettes 112 supply paper to image the various components 120, 122, 124, and 126 to create the image formed surfaces on the papers. Paper cassettes 112 may include papers having various sizes, colors, composition, and the like. Paper cassettes 112 may be removed to refill as needed.

Document processor input feeder tray 130 may be the physical components of MFP 100 to receive papers and documents to be processed. A document is placed on or in document processor input feeder tray 130, which moves the document to other components within MFP 100. The movement of the document from document processor input feeder tray 130 may be controlled by the instructions input by the user. For example, the document may move to a scanner flatbed 210, as disclosed below, for scanning operations. Thus, document processor input feeder tray 130 provides the document to scanner components 120. As shown in FIG. 1, document processor input feeder tray 130 may interact with engine firmware 150 to perform the desired operations.

Memory unit 106 includes memory storage locations 114 to store instructions 115. Instructions 115 are executable on CPU 102 or other processors associated with MFP 100, such as any processors within components 120, 122, 124, or 126. Memory unit 106 also may store information for various programs and applications, as well as data specific to MFP 100. For example, a storage location 114 may include data for running an operating system executed by computing platform 101 to support the components within MFP 100.

Memory unit 106 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 106 also includes any combination of readable or writable volatile memories or non-volatile memories, along with other possible memory devices.

Computing platform 101 may host one or more processors, such as CPU 102. These processors are capable of executing instructions 115 stored at one or more storage locations 114. By executing these instructions, the processors cause MFP 100 to perform various operations. The processors also may incorporate processing units for specific purposes, such as application-specific integrated circuits (ASICs) and field programmable gate arrays (FPGAs). Other processors may be included for executing operations particular to components 120, 122, 124, and 126. In other words, the particular processors cause MFP 100 to act as a printer, copier, scanner, and a facsimile device.

MFP 100 also includes an operations panel 108, which may be connected to computing platform 101. Operations panel 108 may include a display unit 116 and an input unit 117 for facilitating interaction with a user to provide commands to MFP 100. Display unit 116 may be any electronic video display, such as a liquid crystal display (LCD). Input unit 117 may include any combination of devices that allow users to input information into operations panel 108, such as buttons, a touch screen, a keyboard or keypad, switches, dials, and the like. Preferably, input unit 117 includes a touch-screen digitizer overlaid onto display unit 116 that senses touch to receive inputs from the user. By this manner, the user interacts with display unit 116. Scan privacy tool 200 also is connected to operations panel 108, as disclosed in greater below.

MFP 100 also includes network communication processing unit 118. Network communication processing unit 118 may establish a network communication, such as a wireless or wired connection with one or more other image forming apparatuses and a server in an image forming system. CPU 102 may instruct network communication processing unit 118 to transmit or retrieve information over a network using network communication interface 110. As data is received at computing platform 101 over a network, network communication processing unit 118 decodes the incoming packets and delivers them to CPU 102. CPU 102 may act accordingly by causing operations to occur on MFP 100. CPU 102 also may retrieve information stored in memory unit 106, such as settings for MFP 100.

MFP 100 also includes engine firmware 150. Engine firmware 150 may be a combination of hardware and software components that act accordingly to accomplish a task. For example, engine firmware 150 is comprised of components and software to print a document. It may receive instructions from computing platform 101 after user input via operations panel 108. Alternatively, engine firmware 150 may receive instructions from operations panel 108 via scan privacy tool 200.

Engine firmware 150 manages and operates the low-level mechanism of the MFP engine, such as hardware components that actuate placement of toner onto paper. Engine firmware 150 may manage and coordinate the half-toner, toner cartridges, rollers, schedulers, storage, input/output operations, and the like. The raster image processor (RIP) firmware that interprets the page description languages (PDLs) would transmit and send instructions down to the lower-level engine firmware 150 for actual rendering of an image and application of the toner onto paper during operations on MFP 100. Embodiments of engine firmware 150 also are disclosed in a greater detail below.

Figure 2:
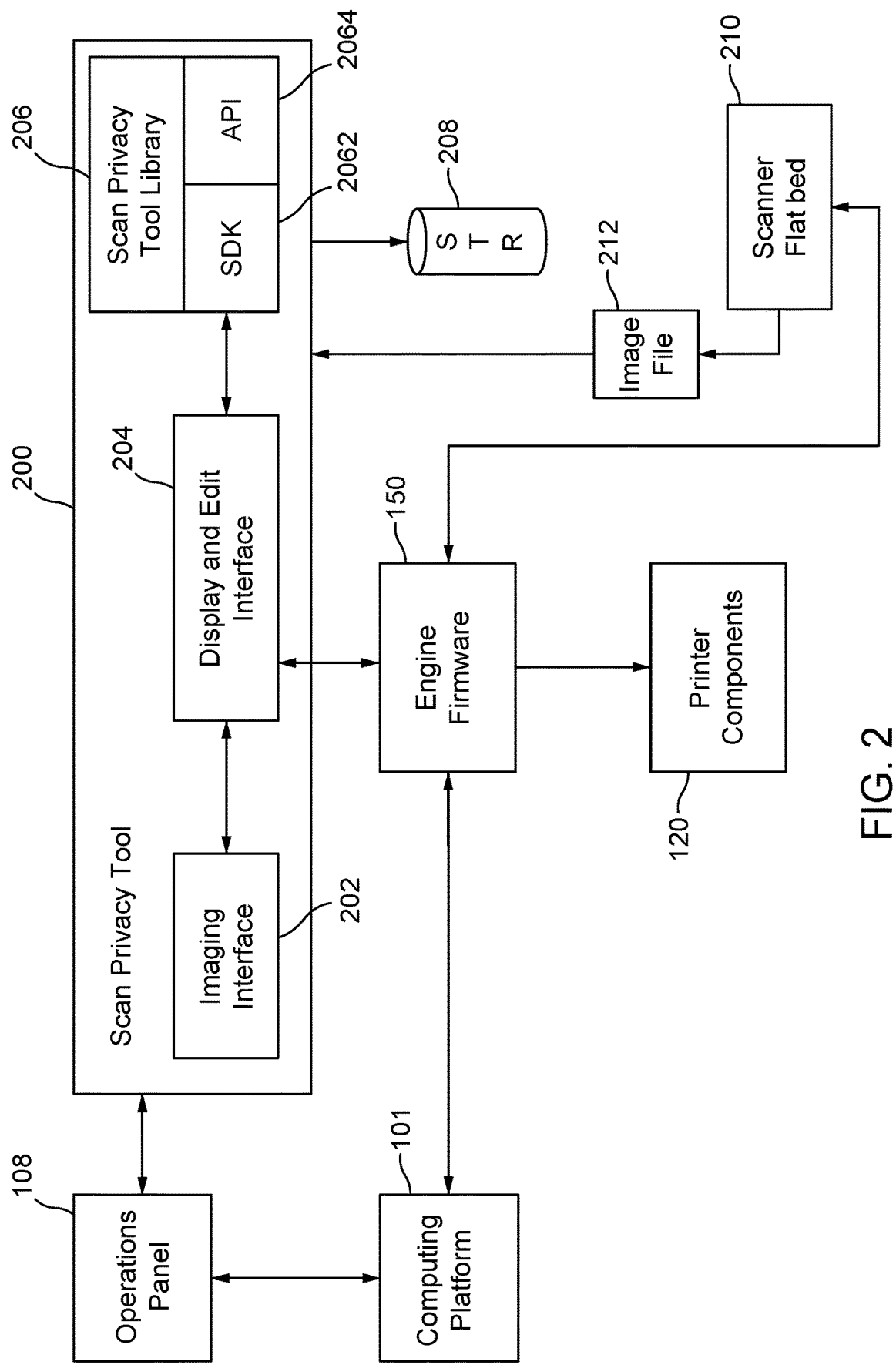
FIG. 2 illustrates a block diagram of components of the scan privacy tool according to the disclosed embodiments.

FIG. 2 depicts a block diagram of components of scan privacy tool 200 integrated inside MFP 100 according to the disclosed embodiments. FIG. 2 shows scan privacy tool 200 operably connected to various components of MFP 100. Scan privacy tool 200 may be integrated into MFP 100, or may be a separate hardware component connected to MFP 100. Alternatively, scan privacy tool 200 may be a mobile device that is connected to MFP 100, either via a wire or other physical connection or wirelessly to network communication interface 110. These embodiments are disclosed in greater detail below.

Scan privacy tool 200 may include three components. Imaging interface 202 provides a scanned document image 212 for displaying on display and edit interface 204. Display and edit interface 204 may act as an interactive interface for performing proofreading tasks on the scanned document image 212. Scan privacy tool library 206 enables the functionalities, capabilities, and imaging routines for making the correction, cleaning, and other proofreading tasks on scanned document 212. Once all edits are made, the updated, modified, or corrected document image 212 is sent to the applicable components by engine firmware 150 for actual saving, copying, printing, faxing, or other actions. Printer components 120 are shown for illustrative purposes in any examples provided below. Engine firmware 150 receives the revised document image from scan privacy tool 200 to accomplish any tasks.

Imaging interface 202 may be an update to current scanner firmware (as part of engine firmware 150), which is the component that scans the physical page from scanner flatbed 210 as part of scanner components 124. Alternatively, scanned document image 212 may be captured using document processor feeder. A scanner firmware update will add support for interfacing with the other components, such as scan privacy tool library 206 and display and edit interface 204 of scan privacy tool 200.

In some embodiments, imaging interface 202 is a module or component that intercepts a scanned document or document image from the current scanner pipeline. The scanner firmware that manages scanner components 124 may include code or a component to interact with imaging interface 202. Normally, the scanner firmware would scan the document or page from scanner flatbed 210, apply the selected effects from operations panel 108, and send document image file 212 to engine firmware 150 for printing, saving, transmission, and the like. Using scan privacy tool 200, imaging interface 202 receives document image file 212 to edit or modify using display and edit interface 204, as disclosed below.

Image interface 202 keeps the editable, rasterized image file in a memory or storage, either within scan privacy tool 200 or external storage 208. As disclosed below, "storage 208" may refer to internal or external memory storage for scan privacy tool 200. Image interface 202 may share the image file with display and edit interface 204 for presenting it to a user for performing the edits. Once all the editing is completed, imaging interface 202 gets back the updated, corrected, or modified image for saving, copying, printing, transmitting, and the like. In other words, after the user finalizes the "corrected document image," this new image file is sent back to imaging interface 202. Imaging interface 202 may send the new image file to engine firmware 150 for further operations within MFP 100.

Scan privacy tool library 206 allows for the image processing of scanned document image 212 through programming interfaces to imaging interface 202. This component of scan privacy tool 200 includes software development kit (SDK) 2062 and application programming interface (API) 2064 that provide functions to support capabilities within scan privacy tool library 206. Scan privacy tool library 206 provides the interface functions to allow querying for location, color, and other similar page content properties for use in the manipulation, correction, and other proofreading effects. It gets reference to document image file 212. Scan privacy tool library 206 also supports interface functions to edit any items or objects in the scanned pages of scanned document image 212. Tools include those to allow for erasure, masking, overwriting, blurring, highlighting, and the like of the selected page items or objects. Other tools include those to add pre-defined patterns such as hatch patterns, colors, objects, and the like on top of or over page items or objects.

Scan privacy tool library 206 includes tools to provide the capabilities to a user of MFP 100 for editing scanned document image 212. The tools may be stored as software components within scan privacy tool library 206 and executed when selected via API 2064 or from display and edit interface 204. The tools may include:

Erase—remove the pattern or object;

Blur-out—pixelate or cause the pattern to be blurred, unreadable, or unrecognizable;

Black-out—overlay a rectangular black box around the pattern or object;

Mask-out—overlay a pre-defined pattern, such as a hatch pattern, on top of the pattern or object;

Highlight—overlay a transparent color on top of the pattern or object;

Encircle—enclose the pattern or object with a circle or elliptical shape;

Rectangular—enclose the pattern or object in a rectangular shape;

Check—overlay the pattern or object with a check-mark;

Cross-out—overlay the pattern or object with a cross-mark or a big X character;

Colorize—change the color of the pattern or object to a user-selected color;

De-colorize—remove color and leave behind the outline of the pattern or object;

Blend—blend a selected pattern or image on top of pattern or object; and

Hide—overlay an opaque pattern, hatch pattern, or image on top of a pattern or object.

The above list may be subject to additional capabilities by tools within scan privacy tool library 206.

Display and edit interface 204 is a component in scan privacy tool 200 that allows for the editing, correcting, and proofreading of scanned document image 212 to actually occur. It acts as the user interface to interact with scanner components 124 to perform the scan privacy tool tasks. Display and edit interface 204 may include a display interface that is a digitized display, such as a touch-screen display, a pen-enabled display, or a stylus-enabled display. Display and edit interface 204 also captures user actions and input. Display and edit interface 204 also may include non-interactive display devices that support this component through the use of motion sensors or control buttons. A user will be able to access display and edit interface 204 to use a finger, digitized pen or stylus, or gestures when using motion sensors to apply the library tools disclosed above supported by scan privacy tool library 206.

In some embodiments, display and edit interface 204 is kind of a "client" of scan privacy tool library 206. Display and edit interface 204 makes use of API 2064 (or APIs) exposed by the scanner firmware to apply the effects to document image file 212. SDK 2062 is provided so that other applications can be developed to take advantage of the tools available in scan privacy tool library 206 to perform effects on the document image. For example, plug-ins may be developed, installed, and access through the printer panel for the manipulation of the document image.

As shown in FIG. 2, scan privacy tool 200 may interact with other components of MFP 100 as well as external devices. Instructions from operations panel 108 may be received to invoke the scan privacy functions support by tool 200. Operations panel 108 also may support display and edit interface 204, as disclosed below. Scanned document image 212 is received as an electronic document from scanner flatbed 210, which is a piece of hardware within MFP 100. Scan privacy tool 200 provides any finished document to engine firmware 150 for additional actions, such as printing, copying, storing, and the like. A detachable storage 208 also may support scan privacy tool 200, as disclosed below. In some embodiments, storage 208 may be within an external device that supports scan privacy tool 200.

Figure 3:
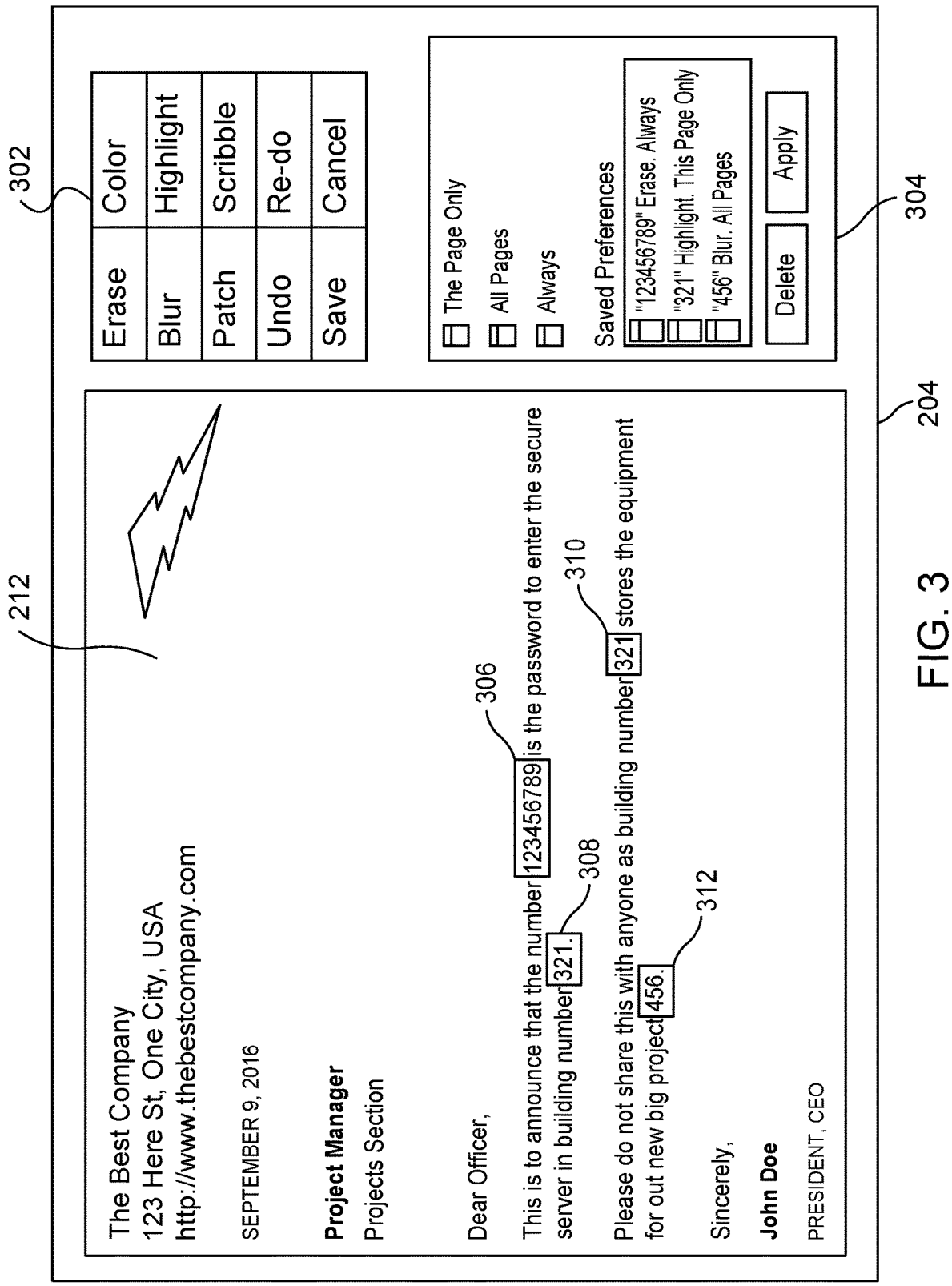
FIG. 3 illustrates an example of a display and edit interface according to the disclosed embodiments.

FIG. 3 depicts an example of a display and edit interface 204 according to the disclosed embodiments. Display and edit interface 204 may be integrated into the scanner system of MFP 100, such as on operations panel 108 or on the document reflective mat, as disclosed below. It also may be supported by a connected device, such as a laptop, tablet, smartphone, or computer. A user interacts with display and edit user interface 204 to make corrections or edits on scanned document image 212, displayed within the interface.

Display and edit interface 204 includes display and edit toolbox 302. Toolbox 302 includes buttons corresponding to the tools available within scan privacy tool library 206. The user may select what actions to use for applying the corrections or edits on scanned document image 212. The selection of one of the buttons within toolbox 302 invokes the functionality associated with the appropriate tool. The user then applies the tool to the text or graphics within scanned document image 212. Toolbox 302 must be present for all types of implementation or form factors of display and edit interface 204. As shown in FIG. 3, some embodiments include toolbox 302 with scanned document image 212.

In one example, the user wishes to erase one or more items within scanned document image 212. Toolbox 302 includes an erase button on display and edit interface 204. The user may select the erase button within toolbox 302 and use the interactive interface, which can be a touch screen display, to select the word, text, graphic, and the like to erase. The user may use a finger, a stylus, or a digital pen to identify the items to erase. In this example, the user applies pressure to the touch screen to indicate the items.

Further to the example, scanned document image may include private information 306, 308, 310, and 312. Private information in this example is text, or, more specifically, numbers. Private information 306 may include a password, while private information 308, 310 and 312 include locations and project information. The user may not wish such information to be reproduced or stored in an electronic format. Other information may be deemed private within scanned document image 212, such as names, address, date, and the like.

The user indicates private information 306-312 for erasure on display and edit interface 204. Referring to FIG. 3, the pixels of scanned document image 212 corresponding to the locations shown for the private information would be changed to reflect the erased text using the erase tool within scan privacy tool library. Alternatively, other actions may be taken using display and edit interface 204, such as blurring the private information or scribbling over it by selecting the appropriate button within toolbox 302.

Once the document has been changed or edited, pattern rule box 304 may be used indicate whether the changes are to be applied to subsequent pages or documents. A pattern-rule pair indicated using pattern rule box 304 may be saved to apply similar patterns in the page or for the rest of the pages in scanned document image 212. As shown, pattern rule box 304 includes check boxes for applying the changes or edits for similar patterns on this page only, all pages, or always.

Referring to the above example, use of pattern rule box 304 may result in identifying private information 310 that has the same numbers as private information 308. Display and edit interface 204 would identify the similar private information and erase it. This may save time and reduce proofreading errors in large documents. This process is disclosed in greater detail below. In another example, the user checks the "Always" box in pattern rule box 304 to save and apply the pattern-rule pair to future scanned jobs. By default, the pair will be checked and selected in the user interface. Thus, unless the user un-selects the checkbox, the user can identify the password of private information 306 to always be erased in documents processed by MFP 100. This function alleviates the need to stop and erase the information on every page or in every document.

Display and edit interface 204 may be invoked using a button that launches scan privacy tool 200. In some embodiments, the feature will be a selectable option on operations panel 108 of MFP 100, such as copy, send, fax, store, and the like. To update, modify, or make corrections on scanned document image 212 shown by display and edit interface 204, the user may interact with an interactive front panel of operations panel 108.

Alternatively, scan privacy tool 200 may be an application executing in a mobile or external device connected to MFP 100. Touch-screen devices, such as tablets, computers, laptops, smartphones, and the like are connected to MFP 100, either using a wired or wireless connection. The device stores and executes the application that supports display and edit interface 204. With regard to a wireless connection, MPF 100 may use network communication interface 110 to exchange data using a known protocol and platform, such as Bluetooth™, WiFi, cellular, and the like. For the wired connection, the device hosting the application for scan privacy tool 200 may connect to MFP 100 using a USB connection and the like.

In some embodiments, the document will be scanned to generate scanned document image 212 in MFP 100. Scanned document image 212 will be viewable and editable in display and edit interface 204 displayed on the external device. The user may make edits, modification, or changes as disclosed above. For example, the user may select the erase button in toolbox 302 to erase private information within scanned document image 212. The user then selects the save button within toolbox 302 to finish edits in the document. The saved electronic document is transmitted to MFP 100 for further processing, such as printing, copying, storing, and the like.

Figure 4:
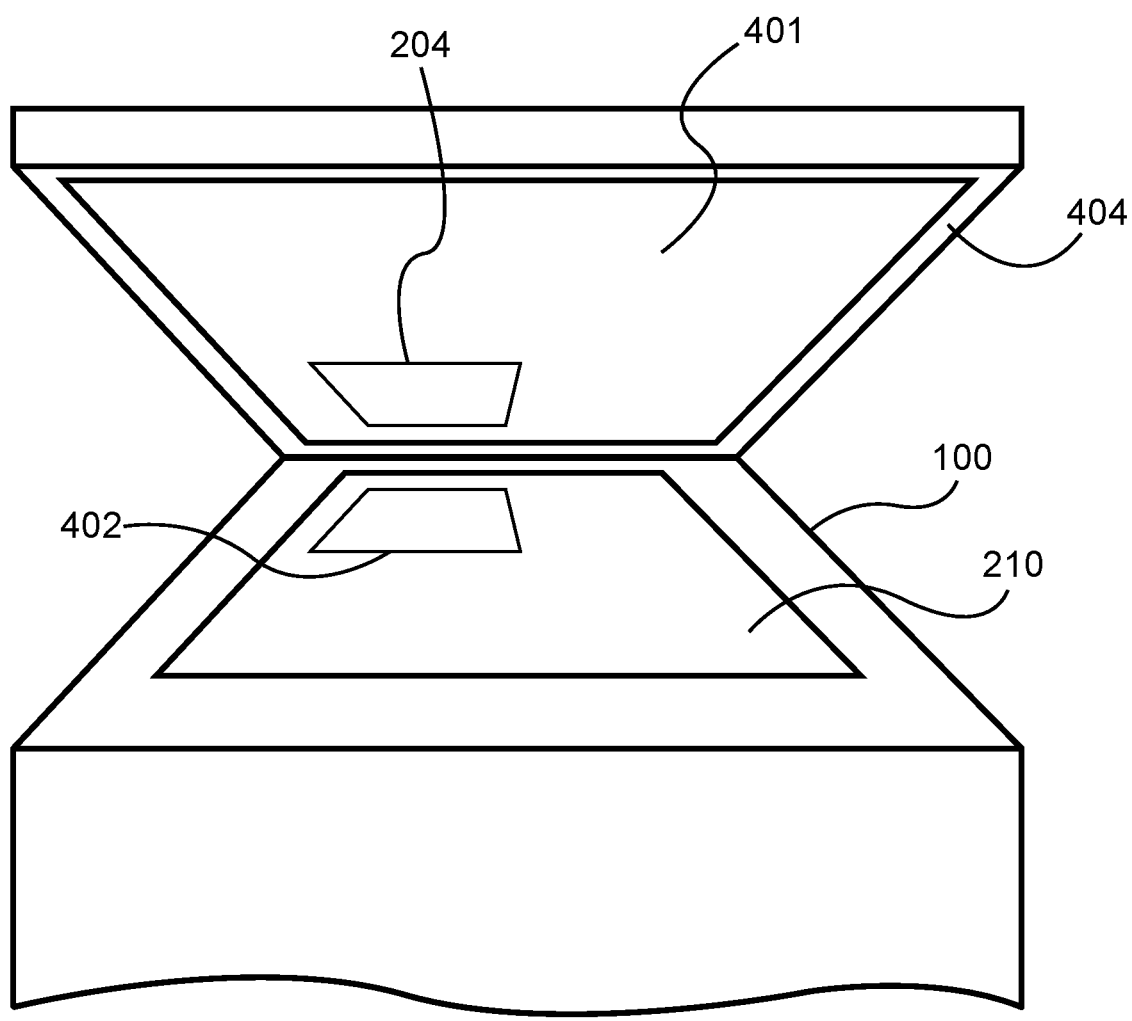
FIG. 4 illustrates another example of a display and edit interface used with a multi-functional printer according to the disclosed embodiments.

FIG. 4 depicts another example of a display and edit interface 204 used with a MFP 100 according to the disclosed embodiments. This configuration of scan privacy tool 200 includes display and edit interface 204 being located on document reflective mat 401. Document reflective mat 401 may work with scanner cover 404 to press document 402 onto scanner flatbed 210. In some embodiments, document reflective mat 401 comprises a touch-screen display.

Because display and edit interface 204 is on the scanner cover or document reflective mat 401, it may not be applicable in all use cases, such as when document feeder tray 130 is used to receive document 402. Scanner cover 404 needs to be raised and opened to gain access to display and edit interface 204. This may not be practical when using document processor input feeder tray 130.

Solutions to using display and edit interface 204 on document reflective mat 401 include enabling the interface only when scanning is done using scanner flatbed 210. If document processor input feeder tray 130 is used, then scan privacy tool 200 is disabled or unavailable. Alternatively, the user may use scan privacy tool 200 in operations panel 108 such that display and edit interface 204 is displayed there as well.

Another solution may be to scan all document sheets from document processor input feeder tray 130. This process then saves all the scanned document images to storage 208. Storage 208, as shown in FIG. 2, may be attached or connected to MFP 100 and scan privacy tool 200. Storage 208 makes the saved document images available to display and edit interface 204 after all pages or documents are scanned. Preferably, storage 208 is external to MFP 100, such as a USB flash drive, so as to not hinder the printer engine, or engine firmware 150, from processing regular jobs. Further, this capability depends on sufficient free space in the memory of storage 208. Edits, modifications, and changes may be made from the first saved document image until the last page.

One also may consider other configurations for display and edit interface 204, such as a tablet or mobile device with a touch screen display. As disclosed above, an application is executed on the external device. The device includes an integrated scan privacy tool 200 along with SDK 2062 and API 2061 to receive scanned document image 212 from MFP 100. The user edits, modifies, and changes private information within the document image using display and edit interface 204 supported by the applicable touch-screen or display device. The modified document images are sent back to MFP 100 for subsequent operations, such as copying, printing, faxing, and the like.

In other embodiments, motion sensors, a mouse, or control buttons may be installed around display unit 116 of operations panel 108 that is not a touch-screen. These components support gestures and the tracking of indicators, such as a finger, hand, pointer, pen, and the like, to manipulate the document images or objects shown on display unit 116. Display and edit interface 204 also may include a virtual reality or augmented reality interface through a smart phone or similar devices. Display and edit interface 204 may be viewable in virtual reality or augmented reality. Gestures and hand motions may edit the document images. Alternatively, controls within the virtual reality environment through the applicable gear device may be used.

Figure 5:
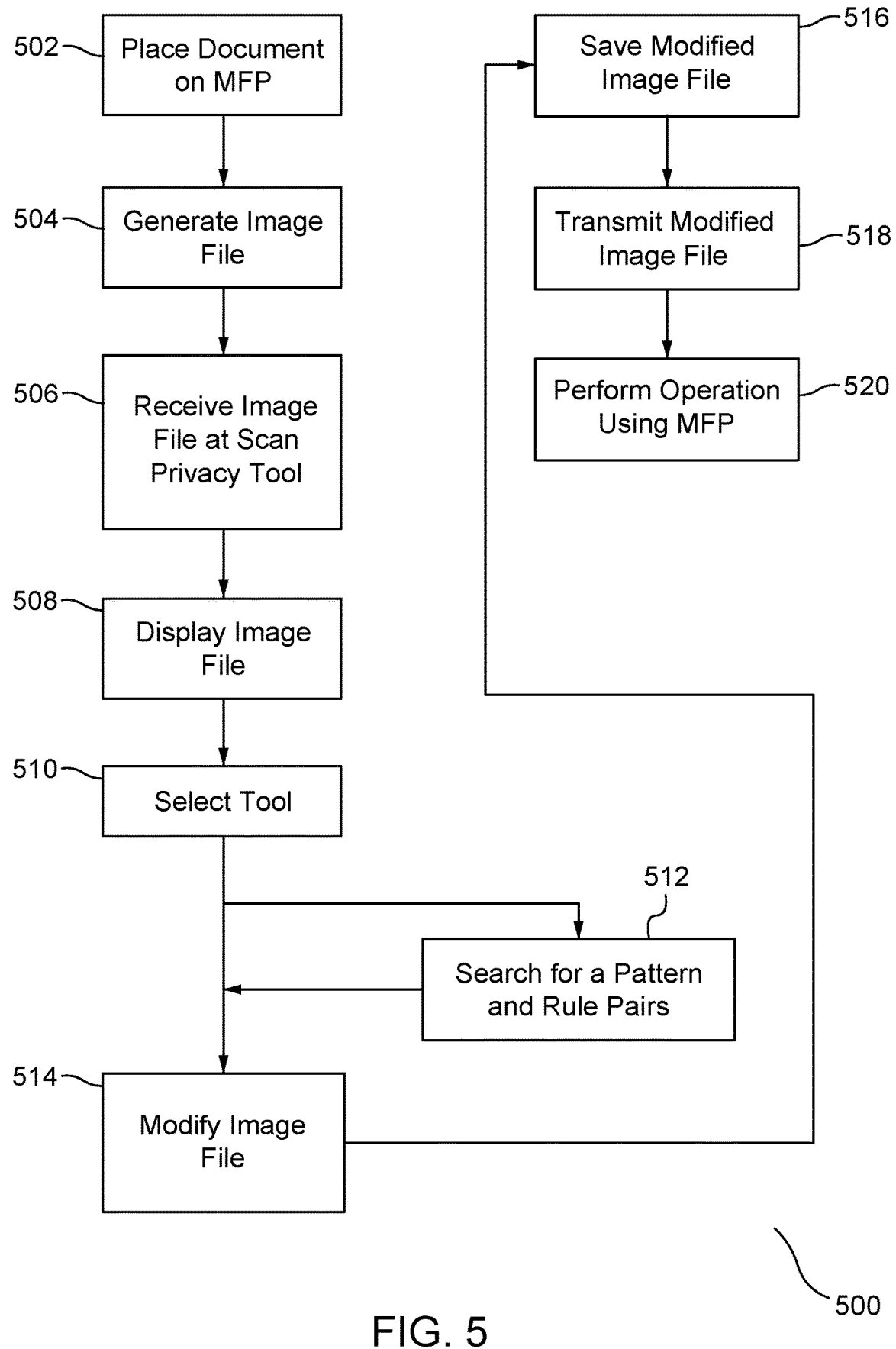
FIG. 5 illustrates a flowchart for modifying a scanned document image using a scan privacy tool according to the disclosed embodiments.

FIG. 5 depicts a flowchart 500 for modifying a scanned document image 212 using scan privacy tool 200 according to the disclosed embodiments. The disclosure for flowchart 500 may include reference to components recited above with regards to FIGS. 1-4 for illustrative purposes. The embodiments disclosed by FIG. 5, however, are not limited to the components shown in those figures.

Step 502 executes by placing document 402 on MFP 100. In some embodiments, document 402 is placed on scanner flatbed 210. In other embodiments, document 402 is placed into document feeder tray 130. Further, document 402 may be more than one page and may contain text and graphics.

Step 504 executes by generating a scanned image file 212 from document 402. Preferably, document 402 is scanned by MFP 100 prior to performing further operations, such as printing, copying, or saving an image file of the document. Scanner flatbed 210 scans document 402. Alternatively, scanned image file 212 may be scanned or generated in another device and sent to MFP 100. Scanned image file 212 may be generated within MFP 100 for privacy tool applications. Scanned image file 212 is an electronic document as opposed to document 402, which may be a physical or hard copy.

Step 506 executes by receiving scanned image file 212 by imaging interface 202 of scan privacy tool 200. Scan privacy tool 200 is a separate component used with or connected to MFP 100. The various physical configurations of scan privacy tool 200 are disclosed above. Preferably, scan privacy tool 200 is hosted on MFP 100 and invoked by pressing a button on operations panel 108. Scan privacy tool 200, however, may be supported by an external device connected to MFP 100. Thus, MFP 100 may send scanned image file 212 to the external device. Alternatively, scanned image file 212 may be initially stored and then provided to scan privacy tool 200 when it is connected to MFP 100.

Step 508 executes by displaying scanned image file 212 on display and edit interface 204 of scan privacy tool 100. Step 510 executes by selecting a tool from toolbox 302 within display and edit interface 204. The tool relates to an action to take with regards to scanned image file 212 and is supported by scan privacy tool library 206.

Step 512 executes by searching for a pattern and at least one modification rule pairs in scan privacy tool library 206. This step may be optional if previous operations have stored patterns and rule pairs using scan privacy tool 200. As disclosed above, modifications on previous documents may be stored and used later by comparing text or graphics in scanned image file 212 to the stored patterns or rule pairs. Using the example above, a password may be searched in subsequent documents and identified as being erased or blurred. This step searches scan privacy tool library 206 for such rules.

Step 514 executes by modifying scanned image file 212 using the scan privacy tool. Step 510 may proceed directly to step 514 if no search is done on patterns or rule pairs within the scanned image file. As disclosed above, the modifications, edits and changes may be performed by touching the screen of display and edit interface 204 to indicated text or graphics using the tool. Step 516 executes by saving the modified scanned image file 212. In some embodiments, the modified scanned image file may be stored on an external device or storage 208. In other embodiments, the modified scanned image file is stored in a memory, such as memory 106, of MFP 100.

Step 518 executes by transmitting modified scanned image file 212 to engine firmware 150 of MFP 100. Step 520 executes by performing operations with the modified image file using MFP 100. These steps correspond to the further actions taken using the modified image file that hides, erases, or modifies the private information in document 402. MFP 100 may print copies of document 402 with the private information erased.

Figure 6:
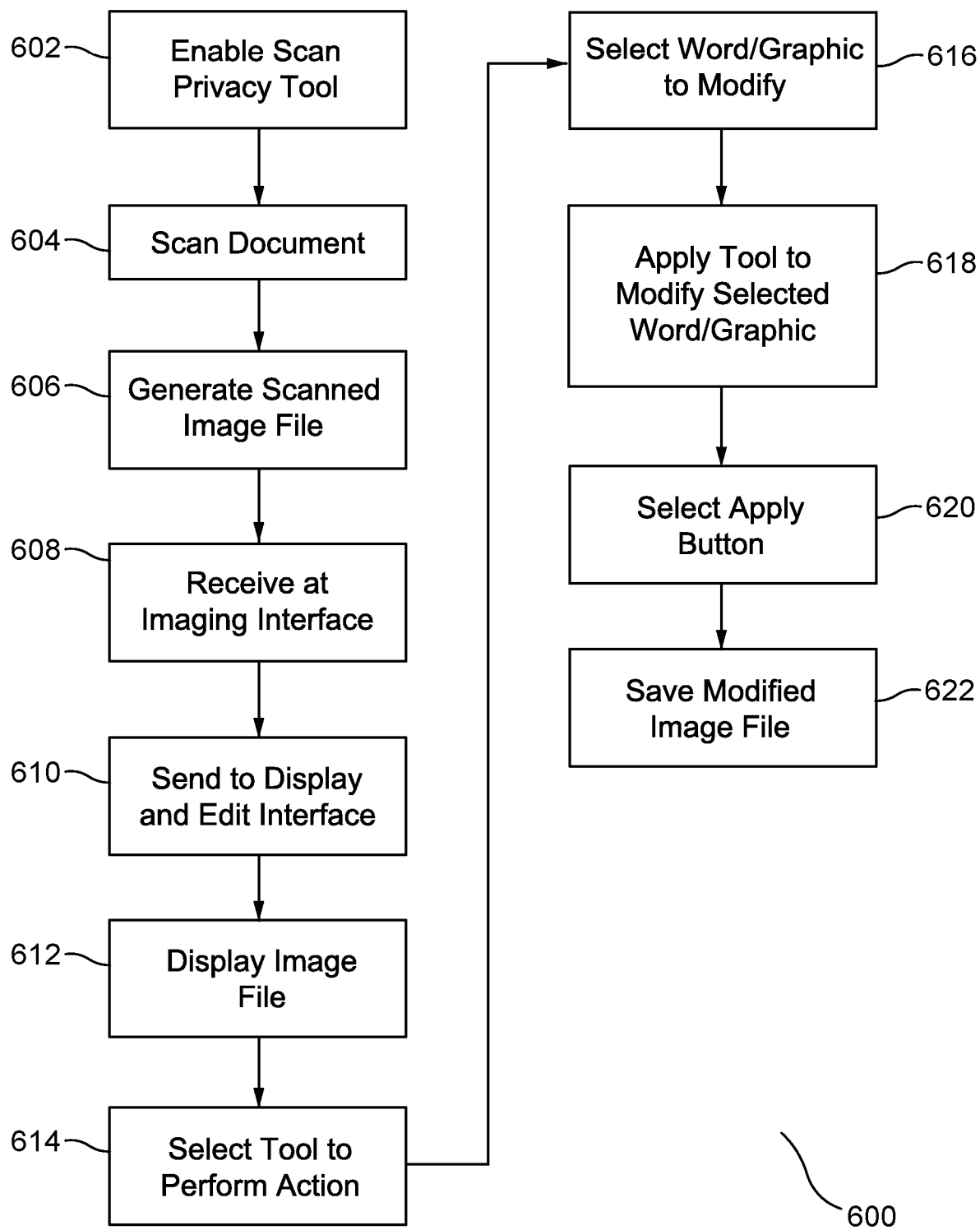
FIG. 6 illustrates a flowchart for using a scan privacy tool with a scanned image file according to the disclosed embodiments.

FIG. 6 depicts a flowchart 600 for using scan privacy tool 200 with scanned image file 212 according to the disclosed embodiments. Flowchart 600 discloses steps similar to flowchart 500 but focuses more on the actions within scan privacy tool 200.

Step 602 executes by enabling scan privacy tool 200. This step may be performed by the user pressing a button on operations panel 108 or other interface, such as within an application, to enable or disable the scan privacy tool feature. The enablement using the button sends a command to MFP 100 to invoke scan privacy tool 200 at the appropriate point within operations to print, copy, scan, fax, and the like. The user also may disable scan privacy tool 200 in this step by pressing a corresponding button.

Step 604 executes by scanning document 402. The user may place the document pages on or in MFP 100. The user may press "start" or another such button on operations panel 108 to commence scanning. Step 606 executes by generating scanned image file 212 from document 402. If the user does not enable scan privacy tool 200, then the document will be scanned and directly saved, copied, printed, transmitted, and the like. This will complete flowchart 600. If scan privacy tool 200 is enabled, then the following steps are executed.

Step 608 executes by receiving scanned image file 212 at imaging interface 202 of scan privacy tool 200. Imaging interface 202 may modify the electronic file to be compatible with the other components within scan privacy tool 200. It also may check to see if scanned image file 212 can be supported by scan privacy tool 200. Step 610 executes by sending scanned image file 212 to display and edit interface 204. Step 612 executes by displaying scanned image file 212 within display and edit interface 204 on a touch-screen display either at MFP 100 or within an external connected device.

Step 614 executes by selecting a tool to perform an action using scan privacy tool 200. The "tool" is displayed as a button in toolbox 302 and relates to a function supported by scan privacy tool library 206. The function allows the user to complete an action to modify scanned image file 212. Step 616 executes by selecting a word or graphic to modify within scanned image file 212. The user can select word using a finger, stylus, digital pen, and the like to identify private information within the scanned image of the document. The user also may select figures, logos, numbers, and the like.

Step 618 executes by applying the tool to modify the selected word or graphic. In some embodiments, scan privacy tool library 206 includes API 2064 that detects the background of the selected private information and uses it to erase or modify any foreground color that the user has touched or identified. For example, a word may be erased by detecting the page of the scanned document image and erasing the text color. The user also may select other tools to use for modifying private information within scanned document image 212. The user also may set pattern rule pairs using pattern rule box 304.

Once the user is done with the modifications, step 620 executes by applying the modifications to scanned document image 212. This may be done by pressing or clicking a "Done" or "Apply" button in display and edit interface 204. Step 622 executes by saving the modified image file and proceeding to the rest of the regular workflow within MFP 100. The modified scanned document image provided by scan privacy tool 200 will be saved, copied, printed, faxed, transmitted, and the like. Further, scan privacy tool 200 may save the modified image file to an external storage for later use.

Figure 7:
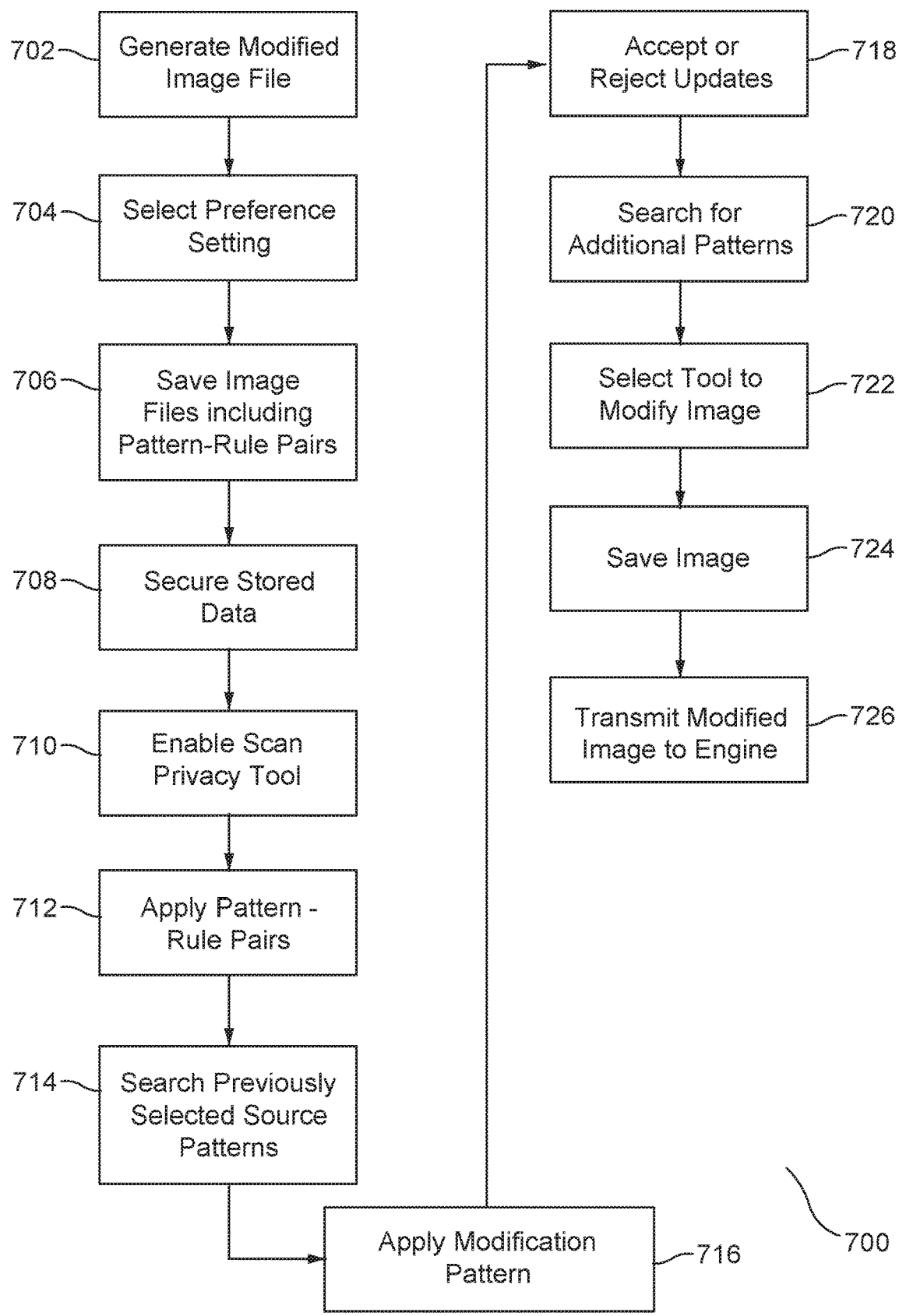
FIG. 7 illustrates a flowchart for pattern recognition and caching using a scan privacy tool according to the disclosed embodiments.

FIG. 7 depicts a flowchart 700 for pattern recognition and caching using scan privacy tool 200 according to the disclosed embodiments. As pieces of confidential and private information are selected and replaced, the original source pattern and the modification pattern may be saved so that a re-occurrence of the source pattern in the same page or in the same document, or subsequent pages and documents, may be replaced with the modification pattern that the user created using the library tools. The original source pattern may be scanned image file 212 provided from scanner flatbed 210 and displayed on display and edit interface 204. The modification pattern is the modified scanned document image that has private information 306-312, for example, changed from the original source pattern. The original source pattern and modification pattern may be known as pattern pair.

Step 702 executes by generating the modified image file based on scanned image file 212. This step generates the original source pattern and modification pattern images used in flowchart 700. The original source pattern and modification pattern also include a rule based on a preference setting or policy.

Step 704 executes by selecting the rule or preference setting to be used with the pattern pair. The preference setting may be selected from pattern rule box 304, as shown in FIG. 3. The preference settings may include an "all pages" box. This setting is a global search and replace rule that applies to all pages in the current scanned job. If checked, then the source pattern will be recognized and search from the current page location forward and replaced with the modifications made by the user on scanned image file 212. This setting may not be saved or may not be permanent for future scanned jobs.

Pattern rule box 304 also includes a "this page only" box. This setting is a local search and replace setting for the current page. The source pattern will be modified only on the current page of scanned image file 212. A source pattern and a modification pattern may not be saved nor cached using this setting.

The "always" box allows the user to create pattern-rule pairs using the original source pattern and the modification pattern. This setting is a permanent search and replace for all subsequent jobs using scan privacy tool 200. The source pattern is modified for all pages in the current scanned job with a modification pattern generated as well. The pair of data for the patterns will be saved and available for use in future operations using MFP 100 and scan privacy tool 200.

Step 706 executes by saving the image files including any pattern-rule pairs. As there may be a lot of pages to be scanned, storage in the memory on MFP 100 may not be practical, especially if other jobs to print, copy, fax and the like may arrive and need to be processed. When MFP 100 is not busy, a local hard drive or memory, such as memory 114, may be used. If no memory is available on MFP 100, then the scanned document images, original source pattern images, and modification pattern images may be saved and cached in external storage, such as storage 208. Alternatively, the images may be saved to an external hard-drive, network storage, a database, cloud storage, and the like.

When the source pattern images and modification pattern images are stored in storage 208 and the like, the user will be able to re-use these images and the patterns for future scanning of the same document. The images and patterns also may be used on other documents that may have the same or similar private, or confidential, information within the text or graphics. Step 708 executes by securing this data within a database within the storage with a password and encryption. Thus, only authorized users may be able to access the original source documents and images that include the private information. The database includes pairs of source patterns and modification patterns and may be encrypted using a high-encryption algorithm.

Step 710 executes by enabling scan privacy tool 200 for a job on MFP 100. After the user presses "start" or a similar command, scanned document image 212 is not immediately printed or processed. Instead, it is made available to the user via scan privacy tool 200 to make corrections, edits, modifications, and the like. Scan privacy tool 200 also may retrieve the pattern-rule pairs from the database.

Step 712 executes by applying the pattern-rule pairs to scanned document image 212 by scan privacy tool library 206. The user may select with pattern-rule pairs to apply. Those having the preference setting of "always" will be automatically applied to scanned document image 212. Step 714 executes by searching previously selected source patterns using image processing. Scan privacy tool library 206 performs scaling, shrinking, skewing, color adjustment, color conversions, and the like in order to search image patterns in scanned document image 212.

Step 716 executes by applying the modification pattern if the source pattern is identified in step 714 in scanned document image 212. Scan privacy tool library 206 finds private information within scanned document image 212 that corresponds to a source pattern saved in storage 208. Scan privacy tool 200 then may apply the modification pattern previously created for the source pattern in an earlier job.

Step 718 executes by accepting or rejecting the updates to scanned document image 212 that are applied using the modification pattern by scan privacy tool 200 based on the previously selected pattern-rule pairs. Those page objects that were auto-corrected or auto-updated will appear in edit and display interface 204 as editable objects within scanned document image 212. The user may drag away, or reject, the overlaid auto-correction or auto-update effects so that they will not be applied for that object. In some embodiments, the user can reject the modification to the scanned document image going forward in the process. The pattern-rule pair may be disabled throughout the document image.

Step 720 executes by searching for additional patterns within scanned document image 212. In some embodiments, optical character recognition (OCR) technology may be used to search textual patterns, as opposed to image patterns, that are specified from the user interface or other tools provided to the user. In other words, the user also may input patterns for which to search in scanned document image 212.

Step 722 executes by selecting a tool from toolbox 302 to modify scanned document image 212. If the user finds other page objects or contents as private information, then a selected tool applies the rules specified in pattern rule box 304 to the changes. In other words, the user may go through the processes disclosed above in FIGS. 5 and 6. The search feature of step 720 also may be used to identify private information in the objects and this step to make the desired edits to scanned document image 212.

Step 724 executes by saving the modified scanned document image. Any new source pattern and modification pattern pairs will be saved along with rules applied during changes using the selected tool. Thus, newly created pattern-rule pairs are saved. Through the use of the OCR technology, text patterns are extracted for use in future searches and to complement image pattern searching. Step 726 executes by transmitting the modified image document to engine firmware 150 of MFP 100 for completing the job.

Thus, a printing system is able to present a scanned document image using the scan privacy tool so that edits, changes, and modifications can be made without having to send the document image to a computer or use known methods of hiding information within the document. Moreover, the patterns created during the modification of the document may be stored for future use in printing or scanning operations. The scan privacy tool includes a display and edit interface that is displayed at the MFP device or on an external device having a touch screen. The user selects a tool from the interface and applies the functions of the tool in making the changes to the scanned document image. The modified document image may be saved or sent to an engine within the MFP device for further jobs, such as printing, faxing, copying, and the like. The changes to remove or obscure the private information are implemented during the jobs.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A system comprising:
 a scanning component to generate an image file of a document;

a scan privacy tool including
an imaging interface to store the scanned image file from the scanning component in a memory location within the scan privacy tool;
a display and edit interface to receive the scanned image file from the imaging interface, wherein the display and edit interface is configured
to display the scanned image file along with a toolbox of tools on a touch screen display, wherein each of the tools correspond to an action to perform within the scanned image file,
to identify a selected portion of the displayed image file, wherein the selected portion is indicated dynamically on the touch screen display,
to select a tool from the toolbox displayed on the touch screen display to modify the text in the selected portion within the displayed image file, and
to modify the selected portion of the displayed image file using the selected tool, wherein the modified portion is made private by the tool so that the selected portion is not viewable;
a scan privacy tool library to support the tool to modify the displayed image file as displayed on the touch screen display of the display and edit interface and to store the privatized portion on the scan privacy tool; and
a printing device to receive the modified image file from the display and edit interface in order to process the image file including the privatized portion, wherein the text corresponding to the privatized portion is not printable or viewable within the image file.

2. The printing system of claim 1, wherein the scan privacy tool is configured to store the privatized portion in a memory.

3. The system of claim 1, wherein the scan privacy tool library includes previously selected pattern-rule pairs having pairs of patterns and modification rules to apply to the scanned image file based on the unmodified portion of the scanned image.

4. The system of claim 1, wherein the scan privacy tool is wirelessly connected to the printing device over a network.

5. The system of claim 4, wherein the scan privacy tool is enabled by a tablet or mobile device having the touch screen display, such that the tool is selected at the tablet or mobile device using the touch screen display.

6. The system of claim 1, wherein the printing device is configured to save, print, copy, or electronically transmit the modified image file having the privatized portion.

7. The system of claim 1, wherein the scan privacy tool library includes library tools including the tool to perform an action to modify the image file.

8. A scan privacy tool for use to modify a document, the tool comprising:
a touch screen display;
an imaging interface to receive an image file of the document and to store the image file in a memory;
a display and edit interface to receive and to display the image file along with a toolbox for a plurality tools on the touch screen display, wherein each of the tools correspond to an action to perform within the scanned image file; and
a scan privacy tool library to make available the plurality of tools to modify a portion of the image file having text,
the display and edit interface to receive an instruction to use a tool to modify the image file to make the portion private, the display and edit interface configured
to select a portion of the displayed image file, wherein the selected portion is indicated dynamically on the touch screen display,
to select a tool from the toolbox displayed on the touch screen display, and
to modify the selected portion of the scanned image file using the selected tool on the touch screen display, wherein the modified portion is made private by the tool so that the text is not viewable on the touch screen display,
wherein the modified portion is stored by the scan privacy tool library as a modification pattern in the memory.

9. The scan privacy tool of claim 8, wherein the modification pattern is applied by the display and edit interface for the portion identified within another image file.

10. The scan privacy tool of claim 9, wherein the modification pattern and at least one preference rule for the modified image are stored in the scan privacy tool library.

11. The scan privacy tool of claim 10, wherein the modification pattern and the at least one modification rule are retrievable by the display and edit interface when the portion is identified in the another image file.

12. The scan privacy tool of claim 8, wherein the display and edit interface includes a display and edit toolbox having buttons corresponding to the plurality of tools of the privacy tool library.

13. The scan privacy tool of claim 8, wherein the scan privacy tool includes a display to apply the tool.

14. A method for modifying an image file of a document, the method comprising:
receiving an image file at a scan privacy tool;
displaying the image file along with a toolbox for a plurality tools on a touch screen display of a display and edit interface, wherein each of the tools correspond to an action to perform within the scanned image file;
selecting a portion having text within the image file using the display and edit interface, wherein the selected portion is indicated dynamically on the touch screen display;
selecting a tool displayed in the toolbox supported by a scan privacy tool library of the scan privacy tool;
modifying the selected portion of the image file using the tool of the scan privacy tool to privatize the selected portion using the tool;
saving the privatized portion of the image file as a modification pattern paired to the unmodified portion of the image file in a memory.

15. The method of claim 14, further comprising receiving the image file from a scanning component.

16. The method of claim 14, further comprising searching for the modification pattern and at least one rule for the privatized portion of the image file in the scan privacy tool library by the display and edit interface.

17. The method of claim 14, wherein saving the modified portion of the image file includes storing the privatized portion in a memory in the scan privacy tool.

18. The method of claim 14, wherein modifying the image includes editing text within the image.

19. The method of claim 14, further comprising applying a rule and a modification pattern to the image using the scan privacy tool library.

* * * * *